US012429180B1

(12) United States Patent
Zheng

(10) Patent No.: US 12,429,180 B1
(45) Date of Patent: Sep. 30, 2025

(54) LAMP SET MODULE WITH TRAPEZOIDAL CONNECTING ROD

(71) Applicant: JOININ GLOBAL PTE. LTD., Singapore (SG)

(72) Inventor: Hongbing Zheng, Singapore (SG)

(73) Assignee: JOININ GLOBAL PTE. LTD., Singapore (SG)

(*) Notice: Subject to any disclaimer, the term of this patent is extended or adjusted under 35 U.S.C. 154(b) by 0 days.

(21) Appl. No.: 18/905,721

(22) Filed: Oct. 3, 2024

(30) Foreign Application Priority Data

Sep. 12, 2024 (CN) ......................... 202422236221.0

(51) Int. Cl.
*F21S 4/28* (2016.01)
*F21V 19/00* (2006.01)
*F21V 23/00* (2015.01)
*F21Y 103/33* (2016.01)

(52) U.S. Cl.
CPC .............. *F21S 4/28* (2016.01); *F21V 19/003* (2013.01); *F21V 23/001* (2013.01); *F21Y 2103/33* (2016.08)

(58) Field of Classification Search
CPC .......... F21S 4/28; F21V 19/03; F21V 23/001; F21Y 2103/33
See application file for complete search history.

(56) References Cited

U.S. PATENT DOCUMENTS 2,829,245 A * 4/1958 Wendell .................... F21V 1/06 362/450
8,864,360 B2 * 10/2014 Parker .................. G02B 6/0085 362/616
2011/0122616 A1 * 5/2011 Hochstein ............... F21V 15/01 362/249.02
2013/0044480 A1 * 2/2013 Sato ........................ F21S 8/061 362/235

(Continued)

FOREIGN PATENT DOCUMENTS

CN 101278100 A * 10/2008 ............... E04B 1/32
CN 204730046 U * 10/2015

(Continued)

OTHER PUBLICATIONS

CN-113107231—Translation (Year: 2021).*

*Primary Examiner* — Zheng Song
(74) *Attorney, Agent, or Firm* — Schwegman Lundberg & Woessner, P.A.

(57) ABSTRACT

A lamp set module with a trapezoidal connecting rod which includes a mounting base and at least two luminous modules. Each of the at least two luminous modules includes a lower frame module, a first connecting rod, a second connecting rod and an upper frame module. All of lower frame modules are matched and connected to form an annular lower frame entirety, the mounting base is arranged above a center of the lower frame entirety, and the upper frame module is clamped on the mounting base from top to bottom. The upper frame module and the lower frame module are (Continued)

connected by the first connecting rod and the second connecting rod, a lower surface of each lower frame module is hollow to form a lower cavity, the luminous module is mounted in the lower cavity of the lower frame module, and a light-transmitting shield is arranged below the luminous module.

20 Claims, 4 Drawing Sheets

(56) References Cited

U.S. PATENT DOCUMENTS

2013/0107528 A1* 5/2013 Boyer .................... F21S 8/033
362/243
2020/0340487 A1* 10/2020 Register ................ F04D 29/005

FOREIGN PATENT DOCUMENTS

CN 113107231 A * 7/2021 ............ E04B 1/3211
KR 200475486 Y1 * 12/2014 .............. F21V 15/01

* cited by examiner

LAMP SET MODULE WITH TRAPEZOIDAL CONNECTING ROD

CROSS REFERENCE TO THE RELATED APPLICATIONS

This Non-provisional application claims priority under 35 U.S.C. § 119(a) to Chinese Patent Application No. CN 202422236221.0 filed on Sep. 12, 2024, the entire content of which is hereby incorporated by reference.

TECHNICAL FIELD

The disclosure relates to a lighting fixture and a fan lamp, in particular to a lamp set module with a trapezoidal connecting rod.

BACKGROUND ART

A fan lamp is an electrical appliance that combines functions of a chandelier and a ceiling fan. Besides basic functions such as lighting and ventilation, most of fan lamps have a decorative function, and there are two types of fan lamps, namely, a traditional straight-blade fan lamp and a blade-hidden fan lamp, in the market.

Illuminants of existing fan lamps generally adopt an integrated molded housing, which is easy to deform, and have a wide and thick light-emitting surface, and an integrated all-plastic fan lamp presents a large volume, high packaging cost and high transportation cost.

An existing modular fan lamp generally includes: a volute, a fan assembly, a diffusion device, an air inlet, an air outlet, an air outlet channel and a lighting assembly. The fan assembly includes a motor and an operation wheel. The diffusion device includes a bearing wall for installing the fan assembly and a first diffusion mechanism positioned at one side of the bearing wall and circumferentially arranged around the operation wheel. The air outlet channel is enclosed by the volute and the diffusion device. A light diffusion plate of the lighting assembly is fully covered over the other side of the bearing wall. The air outlet is arranged at a periphery of the lighting assembly, and an orthographic projection of the lighting assembly on a light-emitting surface does not exceed a maximum boundary of an orthographic projection of the air outlet. In this fan lamp, the light diffusion plate is fully covered over the other side of the bearing wall, the air outlet is arranged at the periphery of the lighting assembly, and the orthographic projection of the lighting assembly on the light-emitting surface does not exceed the maximum boundary of an orthographic projection of the air outlet, so that a ratio of a luminous area of the fan lamp is improved and a luminous flux is improved. With this technology, it can be seen that modularization in related art still stays at a level of simplified installation, but a structure of an actual product is still large, which is not convenient for transportation. Moreover, it can seen from the specific technical scheme that its lamp and fan interact with each other. Due to existence of the lamp, a ventilation hole of the fan can only operate in an annular air outlet manner in a circumferential direction of the lamp and its air inlet hole is small, which shows that a fan function of this technology is largely weakened.

SUMMARY

Technical problem: an object of the disclosure is to solve problems that light-emitting parts of existing lamps and fan lamps are not modularized so that they cannot be disassembled and transported and are inconvenient to install, and functions of fans and lamps affect each other.

Technical scheme: the disclosure adopts following technical schemes.

The disclosure relates to a fan lamp set module with a trapezoidal connecting rod, which includes a mounting base and at least two luminous modules. Each of the at least two luminous modules includes a lower frame module, a waist bracket and an upper frame module. The lower frame module, the waist bracket and the upper frame module are connected end to end to form a closed frame. The upper frame module is connected with the mounting base, and the lower frame module is connected with a luminous frame.

As can be seen from schemes of the disclosure, the lamp of the disclosure is of annular segmented design. On one hand, each segment can exist independently due to this segmented design, which facilitates transportation, and segments can be combined so that the combined annular luminous module is not only beautiful but also leaves room for installation of a fan, which further makes functions of the fan and the lamp not affect each other, and both radiating surfaces of the fan and the lamp can be larger and its service life becomes longer.

Due to adoption of a generally trapezoidal closed structure, a plurality of luminous modules can be assembled together to form a structure with a stable upper frame module and a stable lower frame module and cause an overall structure more stable.

Further, the luminous frame includes a luminous member and a light-transmitting shield. The luminous member is arranged within the light-transmitting shield, and each low frame module is fixed to a respective light-transmitting shield with its low part, so that each lower frame module is connected with a respective luminous frame.

Further, the lower frame module and the light-transmitting shield are respectively provided with a buckling member, and buckling members can be buckled and connected with each other.

Further, the luminous frame, the lower frame module and the upper frame module are all arc-shaped, all of luminous frames are on a concentric circle, all of upper frame modules are on a concentric circle, and all of lower frame modules are on a concentric circle.

An installation space for the fan is provided, and an annular upper frame entirety can be formed in combination with matching and connecting of all of the upper frame modules, and an annular lower frame entirety can be formed in combination with matching and connecting of all of the lower frame modules. The upper frame entirety is located above a center of the lower frame entirety, the mounting base is arranged at an annular center of the upper frame entirety, and a visible annular space between the upper frame entirety and the lower frame entirety is all reserved for the fan, so that functions of the fan and the luminous modules are not influenced by each other.

Further, a buckling part is provided at a side edge of the waist bracket, and respective luminous modules are spliced with each other through buckling of adjacent waist brackets.

Further, the lower frame module is provided with a wire hole, and the waist bracket is provided with a wire slot, and wires are arranged along the wire slot and pass through the wire hole to be electrically connected with the luminous member.

Further, the light-transmitting shield has a width of 12 to 18 mm and a thickness of 22 to 28 mm. The width is a dimension of the light-transmitting shield along a horizontal radial direction and the thickness is a dimension of the light-transmitting shield along a vertical direction.

The light-transmitting shield has a narrow edge and a small thickness, which increases light intensity.

The light-transmitting shield adopts a polycarbonate light-transmitting shield, and the mounting base adopts a polycarbonate mounting base.

Further, the mounting base is circular in shape, and its circumferential sidewall is provided with a plurality of first clamping grooves adapted to a plurality of first clamping protrusions provided on an inner sidewall of the upper frame module.

With this design, an end clamping mode for clamping the connecting rod for connection with the mounting base in a trapezoidal connecting rod design is improved to be linear clamping between an annular entirety composed of the upper frame modules and the mounting base, resulting in a more stable structure.

Further, a fan module is further mounted below the mounting base.

Beneficial effects: Compared with the related art, the disclosure has following advantages.

1. The whole fan lamp is composed of two or more luminous modules spliced together, so that a single luminous module is not easy to deform.

2. The lamp is modularized, simple to assemble, and is with a bottom provided with heat dissipating holes, thus with better heat dissipation and guaranteed service life.

3. The fan lamp can be assembled and disassembled in a modular manner, which simplifies and reduces packaging and facilitates transportation.

4. The module frame has a narrow and thin light-emitting surface, which increases light intensity and has a simple and beautiful appearance.

DETAILED DESCRIPTION

The disclosure will be further explained in the following according to drawings and embodiments.

Embodiment 1

Figure 1:
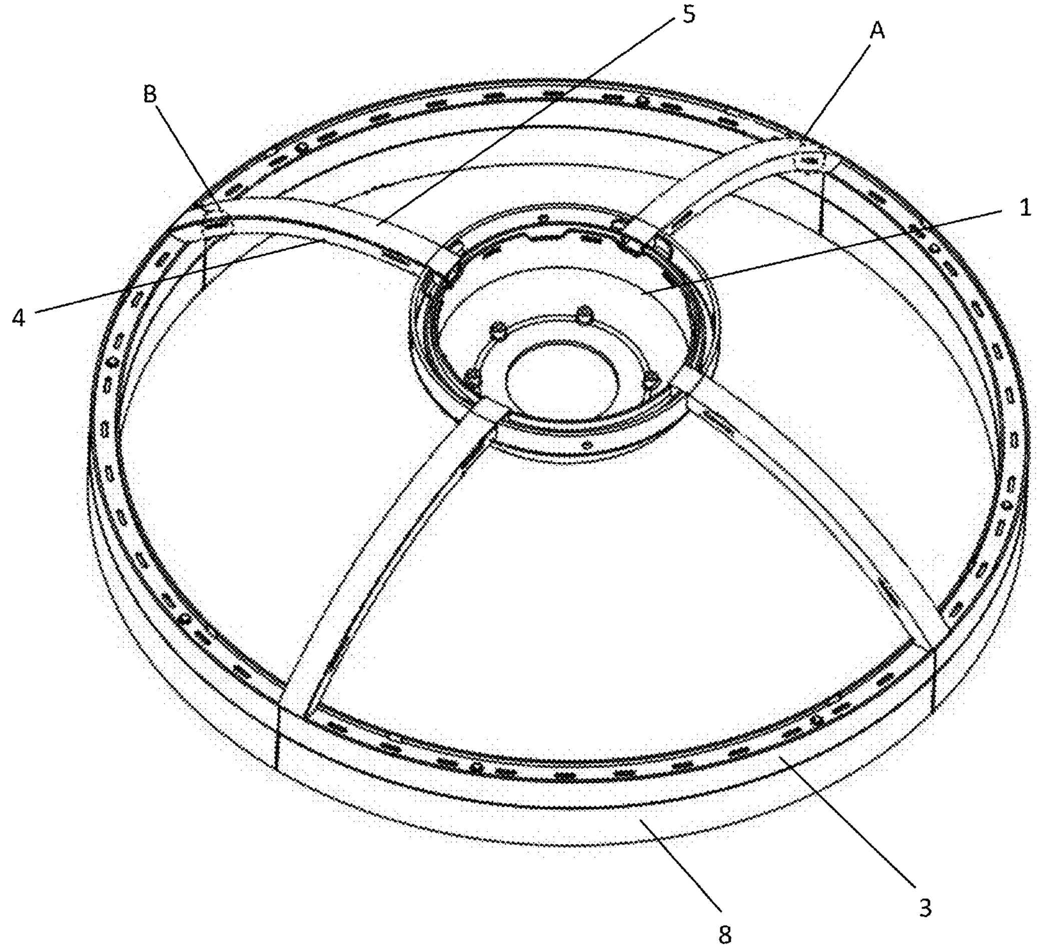
FIG. 1 is a schematic structural view of the disclosure.
Figure 2:
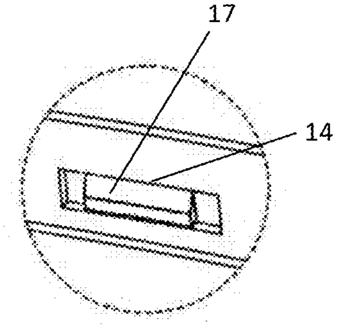
FIG. 2 is a partially enlarged schematic view of the disclosure corresponding to an area A in FIG. 1.
Figure 3:
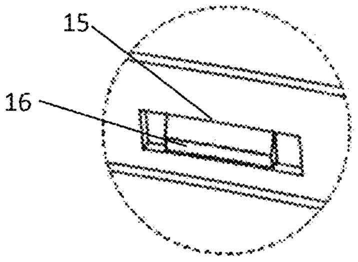
FIG. 3 is a partially enlarged schematic view of the disclosure corresponding to an area B in FIG. 1.
Figure 4:
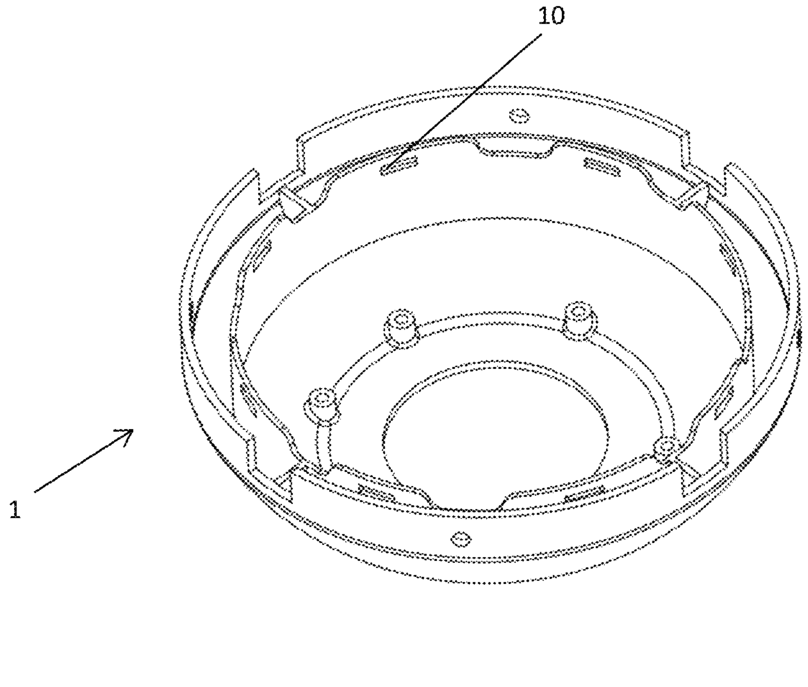
FIG. 4 is a schematic structural view of a mounting base of the disclosure.
Figure 5:
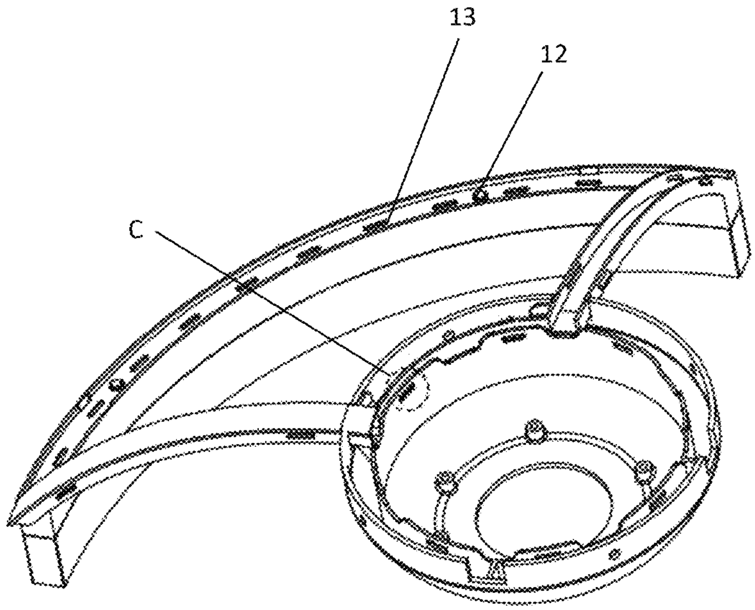
FIG. 5 is a partially enlarged schematic view of the disclosure corresponding to an area C in FIG. 4.
Figure 6:
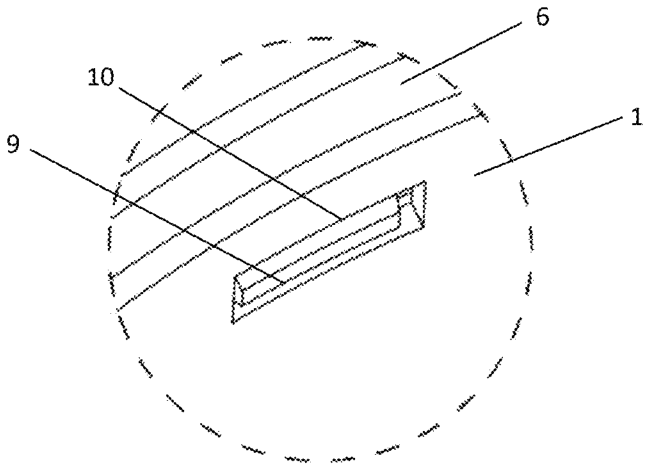
FIG. 6 is a schematic view of connection between a single luminous module and a mounting base of the disclosure.
Figure 7:
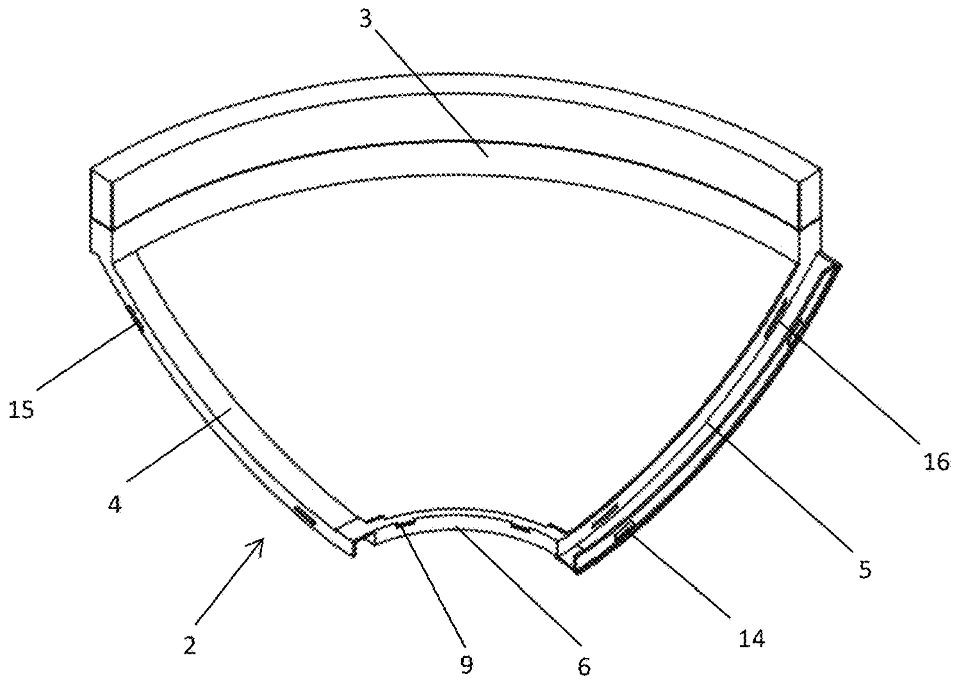
FIG. 7 is a schematic structural view of a luminous module of the disclosure.
Figure 8:
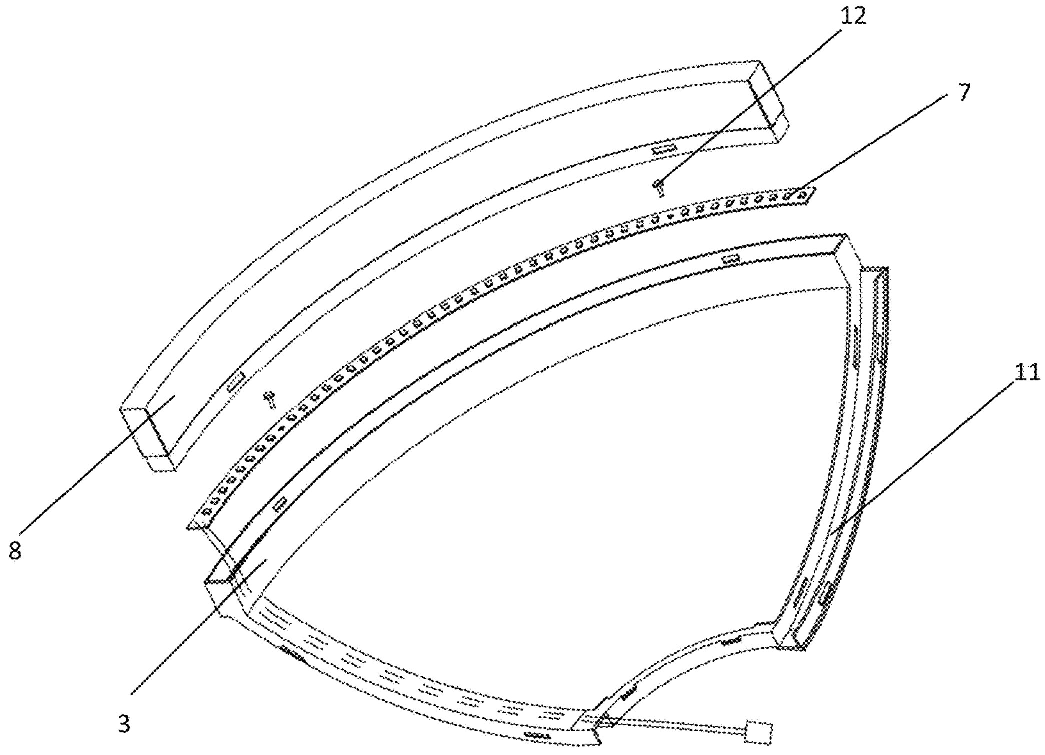
FIG. 8 is a schematic exploded view of a luminous module of the disclosure.

As shown in FIG. 1 to FIG. 8, a lamp set module with a trapezoidal connecting rod includes a mounting base 1 and four luminous modules 2, each of the four luminous module 2 includes an arc-shaped lower frame module 3, a central angle corresponding to each lower frame module 3 is 90°, and the four lower frame modules 3 together form a 360-degree circumference, all of the lower frame modules 3 can be matched and connected to form an annular lower frame entirety, and the mounting base 1 is arranged above a center of the lower frame entirety. An upper surface at two ends of each lower frame module 3 in a length direction are respectively provided with a waist bracket extending towards the mounting base 1. Specifically, the waist bracket can be subdivided into a first connecting rod 4 and a second connecting rod 5, ends of the first connecting rod 4 and the second connecting rod 5 away from the lower frame module 3 are provided with an arc-shaped upper frame module 6 with a size adapted to a side face of the mounting base 1, and the upper frame module 6 is clamped on the mounting base 1 from top to bottom so that a plurality of luminous modules are matched to form a lamp set bracket with a stable structure, a lower surface of each lower frame module 3 is hollow to form a lower cavity, an LED light bar 7 is mounted in the lower cavity of the lower frame module 3, a light-transmitting shield 8 is arranged below the LED light bar 7, and a wiring terminal of the LED light bar 7 passes through a wire hole (not shown) of the lower frame module and a wire slot 11 on the connecting rod to be connected to a power supply placed on the mounting base 1.

A lower part of the frame 3 and an upper part of the light-transmitting shield 8 are respectively provided with a buckling member, and buckling members can be buckled and connected with each other.

The mounting base 1 is circular in shape, and its circumferential sidewall is provided with a plurality of first clamping grooves 10 adapted to a plurality of first clamping protrusions 9 provided on an inner sidewall of the upper frame module 6.

The upper frame module 6, the first connecting rod 4, the second connecting rod 5 and the lower frame module 3 are integrally formed to form a luminous module in a substantially trapezoidal shape.

The light-transmitting shield 8, the lower frame module 3 and the upper frame module 6 are all arc-shaped, all of light-transmitting shields 8 are on a concentric circle, all of upper frame modules 3 are on a concentric circle, and all of lower frame modules 6 are on a concentric circle.

A bottom surface of the lower cavity of the lower frame module 3 is provided with a second screw hole through which a fixing bolt 12 passes and heat dissipating holes 13 evenly distributed along an extending direction of the bottom surface of the lower cavity.

The light-transmitting shield 8 adopts a polycarbonate light-transmitting shield, and the mounting base 1 adopts a polycarbonate mounting base.

The light-transmitting shield 8 has a width of 12 to 18 mm, such as 14.5 mm, 15 mm, 15.5 mm etc., and a thickness of 22 to 28 mm, such as 24 mm, 25 mm, 26 mm. The light-transmitting shield is arc-shaped. The width is a dimension of the light-transmitting shield along a horizontal radial direction and the thickness is a dimension of the light-transmitting shield along a vertical direction.

The first connecting rod 4 and the second connecting rod 5 are both connecting rods with a wire slot along a length extension direction of the connecting rod, and the two connecting rods are respectively arranged at two ends of the lower frame module 3 in the length extension direction. The first connecting rod 4 does not exceed the length extension direction, an outer side face of one of walls of the wire slot is flush with an end face of the lower frame module 3, the second connecting rod 5 is arranged beyond the length direction of the lower frame module 3, and the wire slots of the first connecting rod 4 and the second connecting rod 5 are arranged in opposite directions, so that the wire slots of the two connecting rods can be matched and clamped with each other.

An inner side face of one of walls of the wire slot of the second connecting rod 5 at two sides is flush with the end face of the lower frame module 3, and the other of the walls extends out of the lower frame module 3 by a same distance as a distance between walls of the wire slot of the first connecting rod 4 at two sides.

The wall of the wire slot of the first connecting rod 4 flush with the end face of the lower frame module 3 is provided with a second clamping groove 15 for clamping with a second clamping projection 16 provided on the wall, extending out of the lower frame module 3, of the wire slot of the second connecting rod 5 of an adjacent luminous module, and the other wall of the wire slot of the first connecting rod 5 is provided with a third clamping projection 17 that can be clamped within a third clamping groove 14 provided on the wall, not extending out of the lower frame module 3, of the wire slot of the second link 5 of the adjacent luminous module.

Embodiment 2

On a basis of Embodiment 1, a number of the luminous modules 2 is modified to be two, so that the central angle corresponding to the lower frame module in each luminous module becomes 180°, and the two modules together form a 360° ring structure scheme. A specific number of the luminous modules can be specifically modified according to requirements of production, cost, transportation, etc. With no consideration of transportation cost, the fewer the luminous modules, the better it is, because continuity of lighting can be better (a thickness of a joint of adjacent light-transmitting shields may be doubled, which may affect light transmission, and the lighting may also be discontinuous because of discontinuity between the luminous modules), and corresponding lighting intensity can also be improved. A radius of the combined ring structure can also be increased to increase ventilation of the fan and lighting effect. In order to control cost, the number of the luminous modules are increased, which can facilitate transportation and reduce transportation cost.

The above described embodiments only express several implementations of the present disclosure, and their descriptions are more specific and detailed, but they cannot be constructed as limiting a scope of the present disclosure. It should be noted that, several modifications and improvements can be made by those of ordinary skilled in the art without departing from the concept of the present disclosure, which belong to the protection scope of the present disclosure. Therefore, the protection scope of this disclosure shall be subjected to appended claims.

What is claimed is:

1. A lamp set module with a trapezoidal connecting rod, comprising a mounting base and at least two luminous modules, wherein each of the at least two luminous modules comprises a lower frame module, a waist bracket and an upper frame module, the lower frame module, the waist bracket and the upper frame module being connected end to end to form a closed frame, the upper frame module being connected with the mounting base, and the lower frame module being connected with a luminous frame;

wherein the luminous frame comprises a luminous member and a light-transmitting shield, the luminous member being arranged within the light-transmitting shield and each lower frame module being fixed to a respective light-transmitting shield with a low part of the lower frame module, so that each lower frame module is connected with a respective luminous frame;

wherein the lower frame module and the light-transmitting shield are respectively provided with a buckling member, and buckling members is buckled and connected with each other.

2. The lamp set module with the trapezoidal connecting rod according to claim 1, wherein the luminous frame, the lower frame module and the upper frame module are all arc-shaped, all of luminous frames are on a concentric circle, all of upper frame modules are on a concentric circle, and all of lower frame modules are on a concentric circle.

3. The lamp set module with the trapezoidal connecting rod according to claim 2, wherein the light-transmitting shield of the luminous stand has a width of 12 to 18 mm and a thickness of 22 to 28 mm, wherein the light-transmitting shield is arc-shaped, the width is a dimension of the light-transmitting shield along a horizontal radial direction and the thickness is a dimension of the light-transmitting shield along a vertical direction.

4. The lamp set module with the trapezoidal connecting rod according to claim 1, wherein a buckling part is provided at a side edge of the waist bracket, and respective luminous modules are spliced with each other through buckling of adjacent waist brackets.

5. The lamp set module with the trapezoidal connecting rod according to claim 1, wherein the lower frame module is provided with a wire hole, and the waist bracket is provided with a wire slot, and wires are arranged along the wire slot and pass through the wire hole to be electrically connected with the luminous member.

6. The lamp set module with the trapezoidal connecting rod according to claim 1, wherein the mounting base is circular in shape, and a circumferential sidewall of the mounting base is provided with a plurality of first clamping grooves adapted to a plurality of first clamping protrusions provided on an inner sidewall of the upper frame module.

7. The lamp set module with the trapezoidal connecting rod according to claim 1, wherein a fan module is further mounted below the mounting base.

8. A lamp set module with a trapezoidal connecting rod, comprising a mounting base and at least two luminous modules, wherein each of the at least two luminous modules comprises a lower frame module, a waist bracket and an upper frame module, the lower frame module, the waist bracket and the upper frame module being connected end to end to form a closed frame, the upper frame module being connected with the mounting base, and the lower frame module being connected with a luminous frame;

wherein a buckling part is provided at a side edge of the waist bracket, and respective luminous modules are spliced with each other through buckling of adjacent waist brackets.

9. The lamp set module with the trapezoidal connecting rod according to claim 8, wherein the luminous frame comprises a luminous member and a light-transmitting shield, the luminous member being arranged within the light-transmitting shield, and each lower frame module being fixed to a respective light-transmitting shield with a low part of the lower frame module, so that each lower frame module is connected with a respective luminous frame.

10. The lamp set module with the trapezoidal connecting rod according to claim 9, wherein the luminous frame, the lower frame module and the upper frame module are all arc-shaped, all of luminous frames are on a concentric circle, all of upper frame modules are on a concentric circle, and all of lower frame modules are on a concentric circle.

11. The lamp set module with the trapezoidal connecting rod according to claim 10, wherein the light-transmitting shield of the luminous stand has a width of 12 to 18 mm and a thickness of 22 to 28 mm, wherein the light-transmitting shield is arc-shaped, the width is a dimension of the light-transmitting shield along a horizontal radial direction and the thickness is a dimension of the light-transmitting shield along a vertical direction.

12. The lamp set module with the trapezoidal connecting rod according to claim 9, wherein the lower frame module and the light-transmitting shield are respectively provided with a buckling member, and buckling members is buckled and connected with each other.

13. The lamp set module with the trapezoidal connecting rod according to claim 8, wherein the lower frame module is provided with a wire hole, and the waist bracket is provided with a wire slot, and wires are arranged along the wire slot and pass through the wire hole to be electrically connected with the luminous member.

14. The lamp set module with the trapezoidal connecting rod according to claim 8, wherein the mounting base is circular in shape, and a circumferential sidewall of the mounting base is provided with a plurality of first clamping grooves adapted to a plurality of first clamping protrusions provided on an inner sidewall of the upper frame module.

15. The lamp set module with the trapezoidal connecting rod according to claim 8, wherein a fan module is further mounted below the mounting base.

16. A lamp set module with a trapezoidal connecting rod, comprising a mounting base and at least two luminous modules, wherein each of the at least two luminous modules comprises a lower frame module, a waist bracket and an upper frame module, the lower frame module, the waist bracket and the upper frame module being connected end to end to form a closed frame, the upper frame module being connected with the mounting base, and the lower frame module being connected with a luminous frame;

wherein the lower frame module is provided with a wire hole, and the waist bracket is provided with a wire slot, and wires are arranged along the wire slot and pass through the wire hole to be electrically connected with the luminous member.

17. The lamp set module with the trapezoidal connecting rod according to claim 16, wherein the luminous frame comprises a luminous member and a light-transmitting shield, the luminous member being arranged within the light-transmitting shield, and each lower frame module being fixed to a respective light-transmitting shield with a low part of the lower frame module, so that each lower frame module is connected with a respective luminous frame.

18. The lamp set module with the trapezoidal connecting rod according to claim 17, wherein the lower frame module and the light-transmitting shield are respectively provided with a buckling member, and buckling members is buckled and connected with each other.

19. The lamp set module with the trapezoidal connecting rod according to claim 17, wherein the luminous frame, the lower frame module and the upper frame module are all arc-shaped, all of luminous frames are on a concentric circle, all of upper frame modules are on a concentric circle, and all of lower frame modules are on a concentric circle.

20. The lamp set module with the trapezoidal connecting rod according to claim 16, wherein a buckling part is provided at a side edge of the waist bracket, and respective luminous modules are spliced with each other through buckling of adjacent waist brackets.

* * * * *